United States Patent

[11] 3,579,850

| [72] | Inventors | Herbert Deussner<br>Bensberg-Refrath;<br>Jurgen Langmaack, Niederkassel,<br>Germany |
|---|---|---|
| [21] | Appl. No. | 803,801 |
| [22] | Filed | Mar. 3, 1969 |
| [45] | Patented | May 25, 1971 |
| [73] | Assignee | Klockner-Humboldt-Deutz<br>Aktiengesellschaft<br>Cologne-Deutz, Germany |
| [32] | Priority | Mar. 15, 1968 |
| [33] | | Germany |
| [31] | | P 16 67 148.0 |

[54] DEVICE FOR FEEDING PULVERULENT MATERIAL
1 Claim, 3 Drawing Figs.

| [52] | U.S. Cl. | 34/57E |
|---|---|---|
| [51] | Int. Cl. | F26b 17/10 |
| [50] | Field of Search | 34/57 (E), 10; 263/21 (A) |

[56] References Cited
UNITED STATES PATENTS

| 2,032,827 | 3/1936 | Andrews | 34/57EUX |
|---|---|---|---|
| 2,330,545 | 9/1943 | Benoit | 34/57E |
| 2,856,268 | 10/1958 | Young | 34/57EX |
| 3,190,867 | 6/1965 | Oldweiler et al. | 34/10 |
| 3,317,145 | 5/1967 | Stephanoff | 34/10X |

*Primary Examiner*—Frederick L. Matteson
*Assistant Examiner*—Robert A. Dua
*Attorney*—Singer, Stern & Carlberg ABSTRACT: A device for feeding pulverulent material into a cyclone for treatment therein by a gas. The pulverulent material is introduced into a ring-shaped chamber near the bottom of which a gas is tangentially injected by a number of nozzles which is mixed with the pulverulent material to form a uniform mist which through an annular overflow aperture at the top wall of the ring-shaped chamber overflows into an annular connecting slot which latter discharges the mixture of pulverulent material and gas downwardly into the upper portion of the treatment chamber in the cyclone.

PATENTED MAY 25 1971  3,579,850

INVENTORS
Herbert Deussner
and Jürgen Langmaack
BY
Singer, Stern & Carlberg
Attorneys

DEVICE FOR FEEDING PULVERULENT MATERIAL

The invention relates to a device for feeding a pulverulent material into a chamber for a treatment therein with gases. The device is provided with an annular connection slot between the material feed and the treatment chamber.

When introducing pulverulent material into a treatment chamber, particularly in which the material is treated in suspension in a gas, the problem is to distribute the raw material stream which is supplied by simple conveyor lines so finely that the material does not enter the treatment chamber in the form of a compact jet.

It has been proposed heretofore to arrange on the upper wall of a treatment chamber an annular space which surrounds a centrally disposed gas discharge pipe and to provide the bottom wall of this annular space with an annular slot which is in communication with the treatment chamber. This annular slot is divided by a number of inclined guide blades into individual feed conduits. The pulverulent material to be treated is blown together with air laterally into this annular space, but even though it is mixed with air and even though the annular slot is subdivided into individual channels, there is always produced a compact jet which substantially at one side of the annular slot enters the treatment chamber. This has the result that, for instance at a heating of raw cement powder, that an uneven heating of the individual particles of the material takes place and that only a correspondingly low average temperature of the total amount of the material is obtained. The uneven heating also has the result that the individual raw powder particles will be differently acidified. This is a disadvantage, as far as heat requirement is concerned, when subsequently the material is treated in a rotary furnace for producing clinkers.

An object of the invention is a device in which by means of an annular connecting slot a pulverulent material is introduced in a finely distributed condition uniformly over the entire circumference of the annular slot into a treatment chamber. In accordance with the invention this is accomplished by providing the feed device with a horizontally disposed distribution ring into which the raw material is introduced by one or more feedlines, and that a plurality of nozzles is arranged along the circumference of the distribution ring for the purpose of introducing compressed air or the like into this distribution ring. The mentioned nozzles are all arranged tangentially in the same direction on the circumference of the distribution ring and substantially horizontal adjacent the bottom of the distribution ring. Furthermore, within this distribution ring is arranged an overflow in the form of a vertical circular wall which forms a discharge aperture which is in communication with the annular connecting slot.

The advantage of this device resides in this, that the raw material from the feedline is first introduced into the distribution ring and in the neighborhood of the bottom of this ring is subjected to tangentially introduced compressed air or the like, and thereby is fluidized and is distributed over the entire annular space formed in this ring. Only then when the material reaches a predetermined level in this annular space, which is determined by the height of the overflow wall the material enters through the circular discharge aperture formed by the overflow wall into the connecting slot and from here enters in the form of a uniform material mist into the treatment chamber.

In accordance with a modification of the device of the present invention the annular connection slot is formed between said overflow wall and a short gas discharge pipe which concentrically surrounds in spaced concentric relation a main gas discharge pipe extending centrically into the treatment chamber. Both lower ends of these two pipes extend into the upper portion of the treatment chamber, whereby the upper end of the outer gas discharge pipe is connected with the suction side of a blower which has its discharge side connected with the nozzles which tangentially open into the distribution ring. The advantage of this arrangement is this that in place of cold-compressed air one may employ gases taken from the treatment chamber for fluidization and distribution of the material in the distribution ring. This is always recommended when, for instance, the introduction of cold compressed air is considered unsuitable because it would impair the chemical or thermal efficiency of the device.

In the following will be described with reference to the accompanying drawing and by way of example one embodiment of a heating device for raw cement powder. In the following description there will also be mentioned additional features of the invention.

Figure 1:
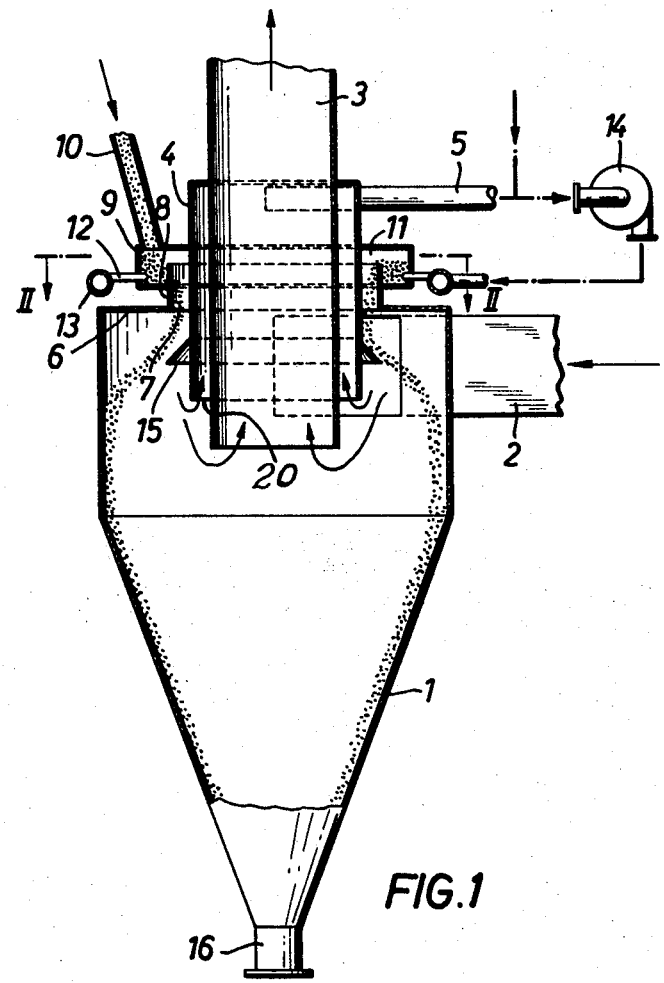
FIG. 1 illustrates a vertical sectional view of a heat exchange cyclone which is equipped with the feeding device of the invention.
Figure 2:
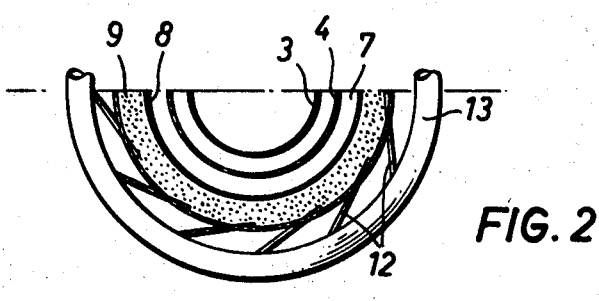
FIG. 2 illustrates a horizontal sectional view of the feeding device along the line II–II in FIG. 1.

Referring to the drawing, the heating device as shown in FIGS. 1 and 2 consists of a cyclone separator 1 which in its upper portion is provided with a tangentially connected pipe 2 which delivers a gas coming from a furnace into the separator 1. A vertical main gas discharge pipe 3 is arranged centrically to the cyclone and extends into the upper portion of the cyclone chamber. In concentrically spaced relation to this main gas discharge pipe 3 is arranged a further discharge pipe 4 so that there is formed a lower annular aperture 20 within the upper portion of the cyclone chamber. The upper end of this annular space is, however, closed and is connected with a tangentially attached gas discharge pipe 5. In order to prevent that the finer particles of the material are carried away by the main gas discharge pipe 3 the discharge pipe 4 preferably extends into the treatment chamber at a shorter distance than the main gas discharge pipe 3. The main gas discharge pipe 3 and the further discharge pipe 4 extend through an aperture in the top wall 6 of the cyclone and extend into the inner cyclone chamber. The aperture in the top wall 6 is sized so that an annular connecting slot 7 is formed between the outer wall of the discharge pipe 4 and a short circular wall 8 which extends upwardly from the edge of the aperture in the top wall 6.

The feed device of the invention is now arranged around this annular connecting slot 7 and comprises a horizontal distribution ring 9 into which from above extends a feedpipe 10 for the raw material. This distribution ring is completely closed except for the connecting slot which is in communication with a circular discharge aperture 11. The circular discharge aperture 11 is formed between the upper edge of the circular wall 8 and the horizontal top wall of the distribution ring and forms circular overflow. Near the bottom of the distribution ring empty a plurality of nozzles 12. These nozzles 12 are distributed over the entire circumference of the distribution ring 9 and are connected to the same tangentially in the same direction and are connected substantially horizontal near the bottom of the distribution ring. The nozzles 12 are all connected with an annular pipe 13 which receives a portion of the furnace discharge gases which are discharged by the discharge pipe 4, enter the tangential gas line 5 and a blower 14 which is used for withdrawing the gases from the cyclone. Preferably, a frustoconical shaped deflecting shield 15 is arranged on the outer circumference of the discharge pipe 4 below the annular connecting slot 7. This deflecting shield 15 has the purpose of preventing the carry away of fine grained material by the gas streams which are discharged by the cyclone. The heated material is withdrawn from an aperture 16 at the lower end of the cyclone, if desired by means of interposing a flap gate or the like, and from here the heated material is conveyed to another place of treatment, for instance, into a rotary furnace, or to any other further heating device.

The operation of the feeding device of the invention is as follows:

The fine-grained material to be heated is conducted by the feedpipe into the distribution ring 9. The furnace gases which are blown into distribution ring 9 by the tangentially arranged nozzles 12 distribute the fine grain material first over the entire circumference of the distribution ring. Only after reaching the upper edge of the wall the fine-grained material does enter the overflow and passes through the discharge aperture 11 and is discharged along the entire circumference of the discharge aperture 11 uniformly distributed into the connection slot 7 and from the latter enters the interior space of the cyclone in the form of a uniform mist. Owing to the hot gas stream which enters the upper portion of the cyclone in a tangential manner there is formed in known manner a vortex sink with a high speed of rotation, while the centrically arranged gas discharge pipe 3 leads the hot gas stream vertically upward. The hot gases which rotate with a high speed take the individual solid particles of the material particles along and owing to their centrifugal forces these particles of material are freely floatingly thrown against the cyclone wall. Since now the material to be treated in accordance with the invention is distributed over the entire circumference of the connection slot and enters the cyclone in a finely distributed uniform material mist, all of the particles of the material are uniformly surrounded by hot gases and will attain during their freely floating movement traversely through the entire hot gas stream and the heat exchange taking place thereby the highest possible temperature. This means also that during the heating of raw cement powder a uniform deacidification takes place so that a very high degree of deacidification of the entire material is accomplished which has been fed into the device. The result is that the subsequently used rotary furnace may be made substantially shorter in length.

Figure 3:
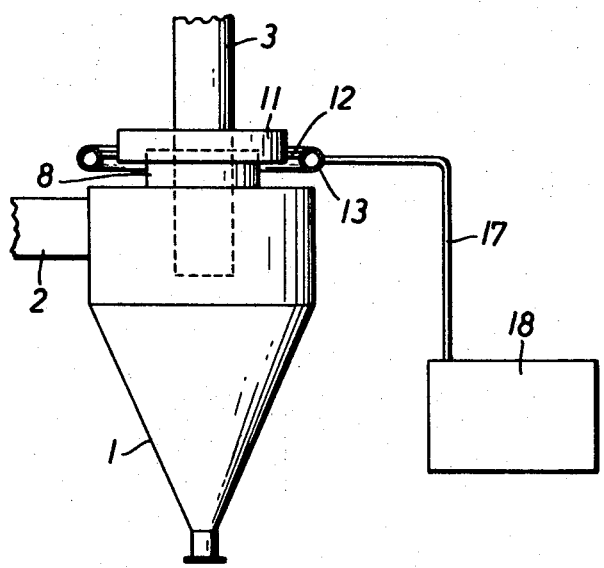
FIG. 3 illustrates a device similar to FIG. 1 with an air compressor.

When a multistage series arrangement of the described heating device is chosen, for instance, for preheating and calcination of raw cement powder, in which the material heated in a preceding stage is fed into the feeding device of the next stage, it is not possible in a heating device which is arranged subsequent to the rotary furnace, owing to the high gas temperature of about 1100° C., to operate the tangential nozzles which open into the distribution ring with the discharge pipes 4, 5 and with the partial gas stream, because until now it was not possible to operate blowers and pressure generators with gases having such high temperatures. For this case it is proposed to omit the coaxial discharge pipe 4, 5, but in other respect to construct the feed device in a manner as shown in FIG. 1. In place of being supplied with heated gases the nozzles 12 of the feed device are supplied with compressed air. For this purpose the annular pipe 13, according to FIG. 3, is connected by a pipe 17 with an air compressor 18. A suitable design of the nozzles and of the pressure generator makes it possible to operate the feed device with small amounts of air which, however, are injected into the distribution ring 9 with a high discharge speed. The heat losses of such an operation are small, because only approximately one percent of the total amount of hot gas enters as leakage air through the nozzles into the heating system. Compared with this, however, there will be obtained the substantial advantage that all particles of the introduced raw cement powder, owing to its uniform distribution into the cyclone, are all heated to substantially the same temperature, so that a very high average temperature is obtained and this is accompanied by a high degree of deacidification of the entire material.

If such a heating device, for instance, used for treating raw cement powder, is followed by an electrostatic dust separator, then the discharge gases from which the material has to be separated, have to have a predetermined content of water and this is accomplished by introducing steam or water into the nozzles. In accordance with the present invention, it is therefore proposed to supply the nozzles 12 which open into the distribution ring 9 with superheated steam so that in addition to a distribution of the material the water content of the discharge gases is advantageously influenced. In such a case the air compressor 18 of FIG. 3 is replaced by a superheated steam generator. Depending upon the required content of water in the discharge gas it may be also of advantage to introduce a gas-steam mixture or an airstream mixture into the distribution ring.

The feed device of the invention is not limited to the described and illustrated examples, but may also be employed with advantage in all those cases in which a fine-grained dry material has to be introduced into a treatment chamber in which the material is treated or comes into reaction with gases or vapors. For this purpose the return of the treatment gases illustrated in FIG. 1 may be combined with an arrangement as illustrated in FIG. 3.

We claim:

1. In a device for treatment of pulverulent dry material with gases, means forming a treatment chamber, means forming an annular distribution chamber for the material above said treatment chamber and having a bottom with an annular slot therein providing communication with said treatment chamber, a circular partition extending upwardly part way into said distribution chamber along the outer edge of said slot to form an overflow means to said slot, supply conduits opening into said distribution chamber, a plurality of substantially horizontal nozzles arranged tangentially to said distribution chamber along its outer circumference adjacent the bottom thereof for introduction of streams of compressed gases tangentially into said distribution chamber, a vertically disposed main gas discharge pipe extending with its lower end centrically into the upper portion of said treatment chamber, another gas discharge pipe surrounding said main gas pipe in spaced concentrical relation and also extending with its lower end into said treatment chamber, a blower having an inlet and an outlet, pipe means connecting the upper end of said other gas discharge pipe with the inlet of said blower, additional pipe means connecting the outlet end of said blower with said nozzles, and a frustoconical deflection shield attached to the outer circumference of said other gas discharge pipe in a position spaced below said annular connection slot.